United States Patent [19]
McNeil

[11] Patent Number: 5,906,686
[45] Date of Patent: May 25, 1999

[54] FIBER OPTIC CONNECTOR CLEANING PROCESS

[75] Inventor: Thomas E. McNeil, Decatur, Ga.

[73] Assignee: Lucent Technologies Inc., Murray Hill, N.J.

[21] Appl. No.: 08/972,547

[22] Filed: Nov. 18, 1997

[51] Int. Cl.[6] .................................................. A47L 13/19
[52] U.S. Cl. ...................... 134/1; 134/3; 134/6; 15/1.52; 385/85
[58] Field of Search ......................... 134/1, 3, 6; 15/1.52; 385/85

[56] References Cited

U.S. PATENT DOCUMENTS

| | | | |
|---|---|---|---|
| 2,616,820 | 11/1952 | Bourgeaux | 148/6.15 |
| 4,065,409 | 12/1977 | Flanagan | 252/528 |
| 4,604,649 | 8/1986 | Carollo et al. | 358/111 |
| 4,901,142 | 2/1990 | Ikuno et al. | 358/98 |
| 5,226,101 | 7/1993 | Szentesi et al. | 385/85 |
| 5,317,661 | 5/1994 | Szentesi et al. | 385/31 |
| 5,376,446 | 12/1994 | Huang | 428/344 |
| 5,768,738 | 6/1998 | Lee | 15/210.1 |

OTHER PUBLICATIONS

Texwipe Datasheet for the ESD Wipe: Jan. 1997.
Citranox Liquid Acid Detergent entry in the Fisher Scientific Catalog.
Alliance Fiber Optics Products, Inc. advertisement for a One–Piece SC Connector.
Weissman and Sekutowski, "Environmentally Conscious Manufacturing: A Technology For The Nineties," AT&T Technical Journal, Nov./Dec. 1991.
Citranox Technical Bulletin, Alconox, Inc 1997.

*Primary Examiner*—Jill Warden
*Assistant Examiner*—Yolanda E. Wilkins

[57] ABSTRACT

A fiber optic connector cleaning process that is both field deployable, and achieves optical reflectance levels of –60 dB and lower. Specifically, the cleaning process according to the instant invention uses electrostatic dissipative (ESD) cleaning wipes along with an acidic detergent and deionized water to remove metallic and metal oxide particles bound to the connector by an electrostatic charge. Advantageously, the acidic detergent is both biodegradable and phosphate free and is therefore environmentally safe. Inasmuch as the instant invention avoids the use of lasers or other machinery, the process can easily be applied in a field setting.

17 Claims, 3 Drawing Sheets

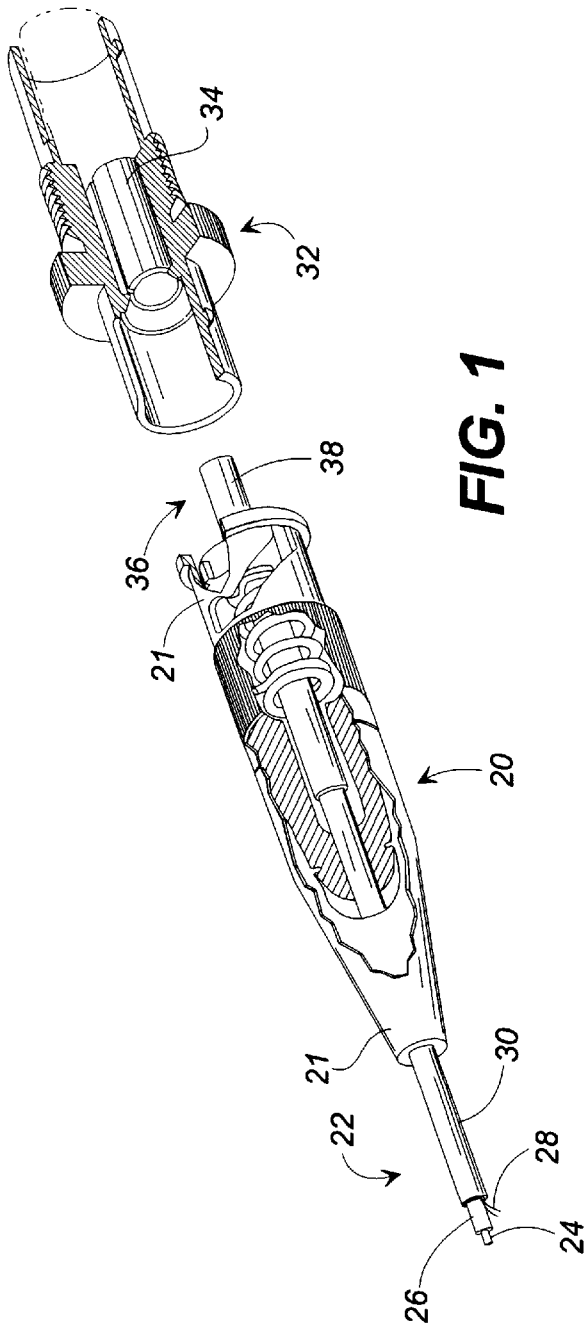
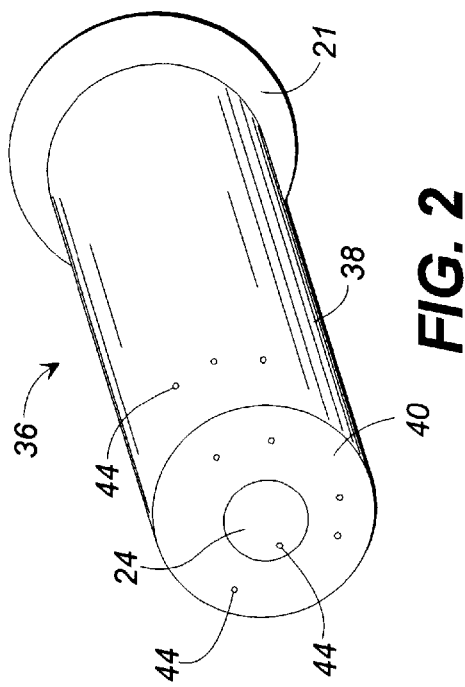

FIBER OPTIC CONNECTOR CLEANING PROCESS

BACKGROUND OF THE INVENTION

1. Field of the Invention

The present invention relates generally to the field of conditioning and cleaning fiber optic connectors, and more particularly to a process for cleaning connectors that is field deployable and provides similar performance to mechanical or laser conditioning processes.

2. Description of Related Art

Fiber-optic waveguides are an attractive transmission medium for modern telecommunication networks because of the high bandwidth associated with light transmission. Moreover, optical fibers provide high bandwidth with relatively low loss or attenuation characteristics when compared with metallic media. However, practical considerations dictate that most networks be comprised of many individual sections of optical cable joined together through a connector or fusion spliced with an electric arc. While splicing offers the highest performance transmission characteristics, remateable connectors are generally preferred to splicing when flexibility is needed for reconfiguration of the network as the network topology changes. To maintain the high quality signal transmission characteristics of the optical fiber, the connectors must be designed and conditioned to minimize optical loss and signal reflectance. For high performance applications, such as analog video, reflectance values of −60 dB or less are desired to ensure that the transmitted signal is not unduly distorted.

Traditional methods for conditioning fiber ends and connectors include flame polishing, grinding and/or polishing using a mechanical device or machine often in conjunction with an aqueous slurry, and treatment of the fiber ends via exposure to a laser beam, electric arc or a microtorch. Once the end faces of the connector are altered to produce the desired performance, it is customary to clean the connector end faces whenever cable segments are first joined or whenever they are remated to remove impurities that can buildup over time. These impurities degrade the performance of the connector by causing unwanted signal reflectance.

Heretofore, connector cleaning processes have used solvents containing volatile organic compounds (VOCs), such as alcohol, to restore performance levels. Unfortunately, these cleaning processes have been unable to improve connector reflectance beyond the range of −50 dB to −55 dB. Inasmuch as organic solvents are known to be effective at removing organic impurities and oils, other factors are clearly dominant when trying to achieve reflectance values beyond −55 dB.

While the aforementioned techniques of polishing or mechanically cleaning the connector and the fiber are effective in restoring connector performance to −55 dB and below, it is readily apparent that these techniques do not lend themselves to application in a field setting. Thus, what is needed is a field deployable cleaning process for optical connectors that exceeds the −55 dB performance level achievable by existing cleaning processes without resorting to intrusive mechanical remedies.

While cleanliness of the cable connections is a critical factor in maintaining the performance of a fiber-optic network, any cleaning process used is a procedure that produces waste. Moreover, U.S. manufacturers are subject to strict federal, state and local legislation that regulate water discharges and treatment and disposal of hazardous chemicals. As discussed in the foregoing, many solutions used to clean fiber-optic connectors contain VOC based solvents and/or phosphate based detergents that are known to adversely affect the human respiratory tract, skin, eyes, liver, kidneys, cardiovascular system, nervous system, and cause an increased risk for developing cancer. Notwithstanding the impact these solvents and detergents have on the public health and welfare, manufacturers may also incur economic hardships through imposition of fines, penalties or fees from governmental environment protection agencies. Thus, it is therefore desirable that a new connector cleaning process be developed that is effective at removing organic based impurities and oils but uses environmentally safe solvents and detergents.

In view of the foregoing discussion, what is sought after is a fiber-optic connector cleaning process that can achieve optical reflectance levels of −55 dB or less while eliminating or dramatically reducing the use of regulated or hazardous chemicals and compounds.

SUMMARY OF THE INVENTION

Certain objects, advantages and novel features of the invention will be set forth in the description that follows and will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a fiber optic connector cleaning process that is both field deployable, and achieves optical reflectance levels of −60 dB and lower. Specifically, the cleaning process according to the instant invention uses electrostatic dissipative (ESD) cleaning wipes along with an acidic detergent and deionized water to remove metallic and metal oxide particles bound to the connector by an electrostatic charge. Advantageously, the acidic detergent is both biodegradable and phosphate free and is therefore environmentally safe. Inasmuch as the instant invention avoids the use of lasers or other machinery, the process can easily be applied in a field setting.

According to one embodiment of the instant invention, an ultrasonic bath is used in conjunction with the aforementioned cleaning components to further assist in removing contaminants from the connector through the use of ultrasound. Moreover, through use of the ultrasonic bath, the number of manual cleaning steps can be reduced, which is an advantage in a manufacturing environment.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an optical connector;

FIG. 2 is a perspective view of the ferrule used in an optical connector;

DESCRIPTION OF THE PREFERRED EMBODIMENT

Figure 3:
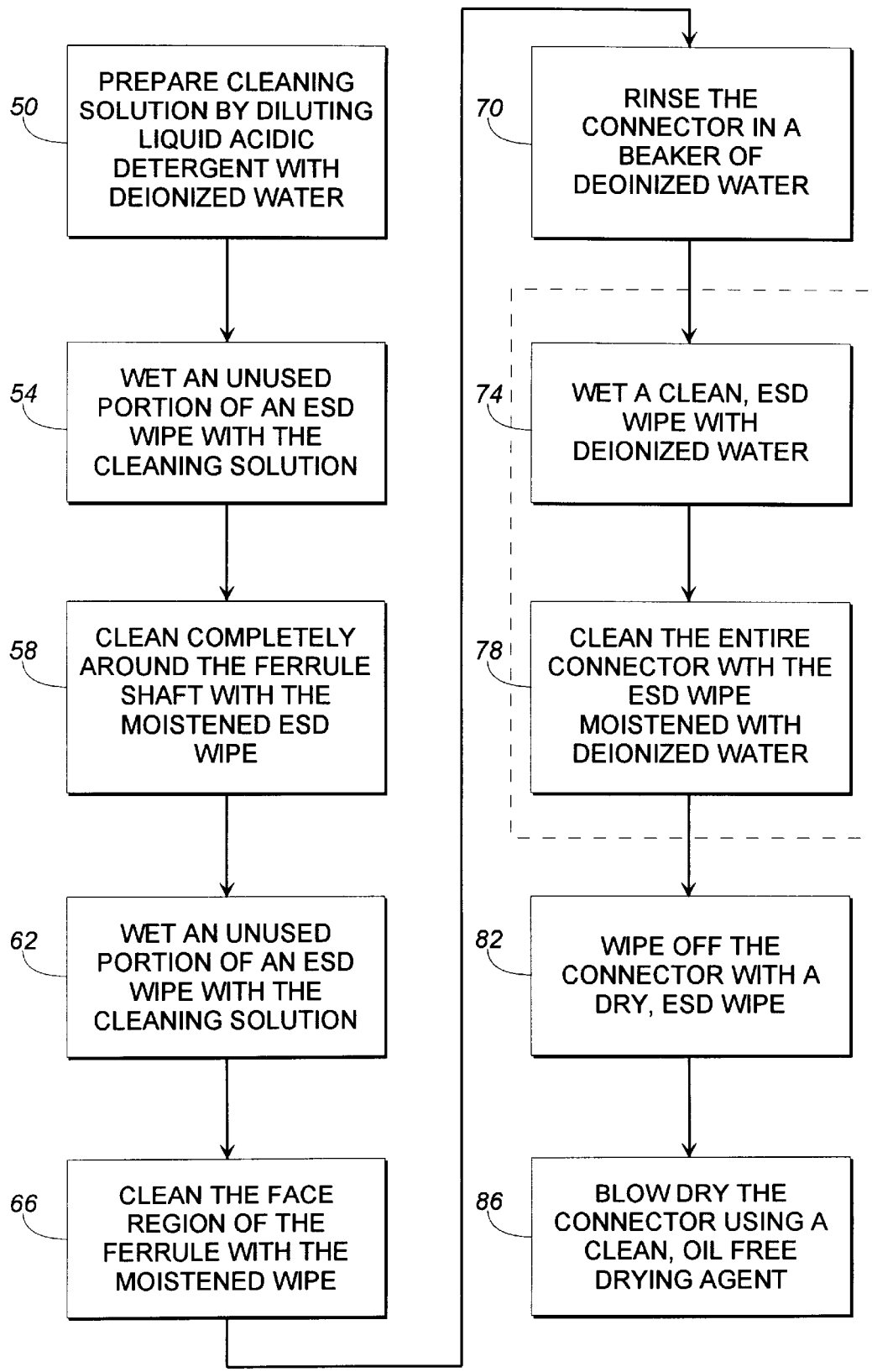
FIG. 3 is a flow chart of an optical connector cleaning process according to the instant invention.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Referring now to FIG. 1, an ST® type connector 20 is shown in which connector body 21 terminates optical cable 22. Optical cable 22 includes an optical fiber 24, which is comprised of a core and a cladding surrounded by one or more layers of an acrylate coating material for protection. Additionally, optical fiber 24 may be surrounded by a layer of polyvinyl chloride (PVC) to provide what is referred to as a buffered fiber 26. Further, a sheath system is shown, illustratively comprising strength members 28 made from aramid fibrous material and an outer jacket 30 made from PVC. Together, these elements form an optical cable 22 that has excellent transmission and handling characteristics, but which cannot be joined to other optical equipment without a connecting arrangement. For that purpose, coupling device 32 is used to join two optical connectors together as needed. An alignment sleeve 34 is disposed in coupling device 32 for aligning ferrule 36 carrying optical fiber 24 with another ferrule and optical fiber.

FIG. 2 is a perspective view of ferrule 36 carrying optical fiber 24 and having a shaft region 38 and a face region 40. Ferrule 36 is typically made from a metal oxide such as zirconia ($ZrO_2$) or aluminum oxide ($AlO_2$). Although not drawn to scale, the diameter of ferrule 36 is generally twenty times the diameter of optical fiber 24. For example, it is not uncommon for ferrule 36 to have a diameter of 2.5 mm with optical fiber 24 having a diameter of 125 $\mu$m. With optical fiber 24 having such a small diameter, it becomes clear that even microscopic particles 44 can be a source of performance degrading reflectance.

As discussed hereinbefore, field deployable cleaning procedures based on organic solvents have been ineffective in achieving optical reflectance levels lower than −50 dB to −55 dB in connectors such as the ST connector depicted in FIG. 1. To break through this performance wall at −55 dB, the cleaning process according to the instant invention focuses on those factors affecting signal reflectance at the high end of the performance spectrum.

It is theorized that the primary factor affecting reflectance at levels below −55 dB is the presence of metal and metallic oxide particles. Metals and metal oxides are known to be highly reflective in the near infrared region of the light spectrum, which is where fiber optic networks operate. Moreover, there are numerous sources that could supply the suspect particles. First the ferrule itself is normally made from a metallic oxide compound as discussed earlier. A second source for metallic particles are the polishing compounds used in polishing the face regions of the ferrules. Finally, the tooling of the connector during manufacture tends to leave metallic particles on the connector.

The question still remains, however, even if metallic particles are causing optical reflectance, why are existing cleaning methods ineffective at removing them from the ferrule face regions of the connectors? If metallic particles are the primary source of optical reflectance at high performance levels, then there must be a force that binds the particles to the ferrule and its face that is resistant to current cleaning techniques that remove other organic impurities and foreign matter. To understand the nature or cause of this force, it is helpful to examine the way in which optical connectors are used and cleaned.

By their very nature, optical connectors are designed to provide flexibility in configuring optical networks. However, the friction generated through continuous mating and remating of the connectors tends to create ions along the surface of the ferrules and their end faces, which, in turn, generates an electrostatic charge. Furthermore, existing cleaning processes, in which ferrules are cleaned with organic solvents using lint-free cloths or pads, do not diminish the electrostatic charge, but, on the contrary, actually contribute to a continued buildup of the charge. Thus, the metal and metallic oxide particles are bound to the ferrule through an electrostatic or coulombic bond, which is actually enhanced by currently used cleaning processes. Therefore, to be effective in reducing optical reflectance below the −55 dB level, an improved cleaning process needs to attack the electrostatic bond so that the foreign metallic particles and ions can be removed.

Accordingly, the optical connector cleaning process according to the instant invention has three primary goals: 1) to minimize contaminants, both organic and metallic; 2) to minimize the creation of ions and electrostatic charges; and 3) to use environmentally safe cleaning solvents and detergents.

FIG. 3 is a flow chart detailing a preferred combination of steps according to the instant invention that accomplish the three aforementioned goals. In step 50 the cleaning solution is prepared, which preferably comprises a 4% by volume biodegradable acidic detergent in deionized water. One example of a biodegradable acidic detergent that can be used is CITRANOX® brand detergent sold by Alconox, Inc., 9E 40th St., Room 200, New York, N.Y. 10016, as it is both phosphate free and completely biodegradable and is designed to remove both metals and metal oxides from hard surfaces in addition to organic impurities and oils. Moreover, the use of diluted CITRANOX as a cleaning solution results in a substantial decrease in VOC emissions when compared to traditional, alcohol based cleaning solutions. For example, a 4% concentration of CITRANOX reduces VOC emissions more than 96% from the emission level seen from ethyl alcohol. It is important that deionized water be used throughout the cleaning process to avoid introducing additional ionic or electrostatic charges to the connector. While 4% is the preferred concentration for the acidic detergent, experience has shown that concentrations in the range of 1% to 10% can be used depending on the condition of the connector to be cleaned.

Once the acidic detergent solution (hereinafter "cleaning solution") is prepared, an unused portion of an electrostatic dissipative (ESD) wipe is wetted for cleaning the connector as stated in step 54. An example of a wipe suitable for this purpose is the ESD wipe sold by Texwipe, L.LC., 650 E. Crescent Ave., Upper Saddle River, N.J. 07458. The key concern in choosing a wipe is the ability of the wipe to dissipate or drain electrical charge without introducing new impurities. For most connectors, approximately 5–10 ml of cleaning solution is sufficient; however, the amount used in practice will be dependent upon the condition of the connector.

The ferrule shaft 38 is then cleaned using firm, but gentle pressure in step 58. While impurities on ferrule shaft 38 clearly do not cause reflectance, they may nevertheless work themselves towards face region 40 where they could interfere with the light transmitting through optical fiber 24.

After wetting an unused portion of the electrostatic dissipative wipe with approximately 5–10 ml of cleaning solution in step 62, face region 40 is similarly cleaned using firm, but gentle pressure in step 66.

In step 70, the connector is thoroughly rinsed in a beaker or other container of deionized water to wash off any particles or impurities that may remain. If the initial condition of the connector is relatively clean, steps 74 and 78 can be skipped in favor of proceeding directly to step 82. However, for connectors suffering from high optical signal reflectance, an unused portion of the electrostatic dissipative wipe should be wet with approximately 5–10 ml of deionized water in step 74 and both ferrule shaft 38 and face region 40 cleaned with firm, but gentle pressure in step 78.

In step 82, the connector is wiped dry with a clean electrostatic dissipative wipe to ensure that no ionic charge remains on any part of the connector and to again remove any residual particles or impurities that may still remain.

Lastly, the connector is blown dry using a clean, oil free drying agent such as compressed air or, more preferably, dry nitrogen. Typically, the connector dries in approximately 10–15 seconds; however, the actual time taken is a function of the drying agent used and the geometry of the connector.

Through use of this cleaning procedure, optical reflectance has been reduced to −60 dB and below, which was heretofore unattainable without using a laser or other means of mechanically conditioning or polishing the connector. Moreover, the process according to the instant invention is field deployable allowing technicians to restore network performance that has degraded over time. Advantageously, the cleaning solution used in the instant invention minimizes VOC emissions and is void of phosphates both of which could severely limit application of the process without incorporating additional, and possibly expensive, environmental safeguards.

Figure 4:
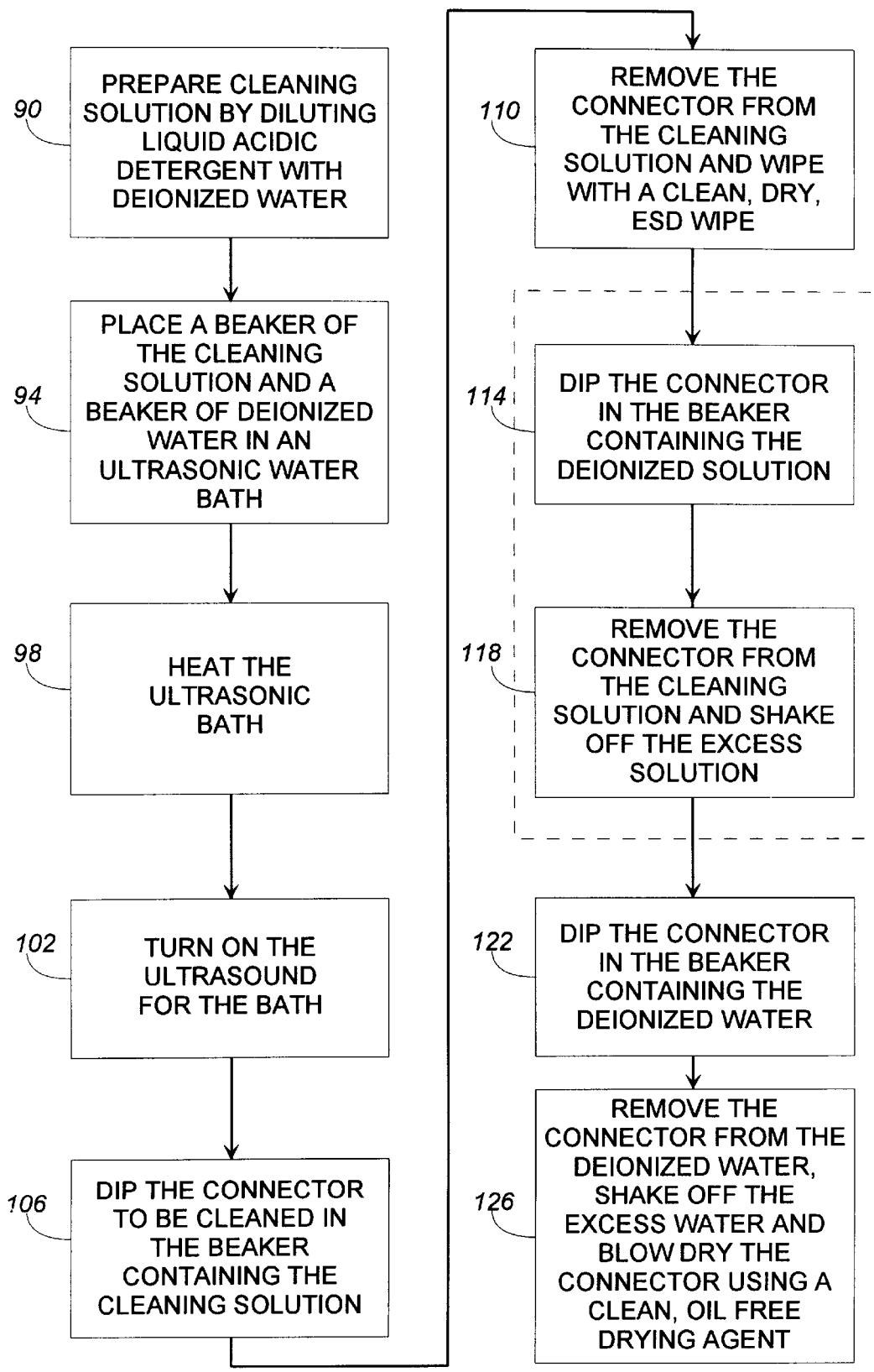
FIG. 4 is a flow chart of an alternative optical connector cleaning process according to the instant invention.

An alternative cleaning procedure that incorporates an ultrasonic bath is shown in the flow chart of FIG. 4.

A cleaning solution is prepared in step 90 as discussed with reference to step 50 in FIG. 3. One beaker or container is then filled with the cleaning solution prepared in step 90 and another beaker is filled with deionized water. The size of the beakers should be chosen based on the size of the connectors being cleaned and for convenience.

The beakers are then placed in an ultrasonic water bath in step 94, which is preferably equipped with heat. If so equipped, the heating element for the bath is turned on in step 98 allowing the bath to warm. The bath will typically take approximately 30 minutes to heat up, but this time will clearly vary from manufacturer to manufacturer.

Once the bath has reached a stable temperature, the ultrasound is turned on in step 102 to begin the cleaning steps. First, the connector to be cleaned is dipped in the beaker containing the cleaning solution for a period ranging from 15 seconds to 2 minutes in step 106. The sound waves transmitted through the cleaning solution act to break loose particles and impurities on the surface of the connector. While it may be preferable in a manufacturing environment to keep this time as short as possible to maximize throughput, for greatest performance it is better to leave the connector immersed for too long a period than for too short a period.

The connector is then removed from the cleaning solution in step 110 and gently wiped dry with a clean electrostatic dissipative wipe to ensure that no ionic charge remains on any part of the connector and to remove any residual particles or impurities that may remain.

Optionally, the connector is placed back into the beaker containing cleaning solution in step 114 for another 15 seconds to 2 minutes. Again, longer immersion times are more effective in cleaning the connector and thus produce greater performance.

After the second application of the cleaning solution in step 114, the connector is removed from the beaker and the excess solution is shaken off in step 118. The connector is then rinsed in the beaker containing the deionized water in step 122. As discussed hereinbefore, deionized water should be used to avoid contaminating the connector with additional ionic or electrostatic charges.

Once the connector has been thoroughly rinsed, it is removed from the deionized water beaker and dried in step 126 using a clean, oil free drying agent such as compressed air or dry nitrogen.

Similar to the first optical connector cleaning procedure described herein, the instant cleaning procedure incorporating an ultrasonic bath has reduced optical reflectance to −60 dB and below. Again, the present cleaning process is field deployable as the ultrasonic water bath can be ported to field sites with relative ease. Inasmuch as the instant cleaning process reduces the number of steps requiring manual wiping of the connector when compared to the earlier described procedure, it may be preferred in a manufacturing setting.

The principles of the invention have been illustrated herein as they are applied to a process for cleaning optical connectors. From the foregoing, it can readily be seen that the process according to the instant invention attacks the electrostatic bond holding metallic and metal oxide particles on a connector through use of electrostatic dissipative wipes, deionized water, ultrasound, and an acidic detergent that acts as a catalyst. Once the electrostatic bond is broken, the acidic detergent cleans these particles from the connector, along with other organic impurities and oils. In the preferred embodiment, an environmentally safe acidic detergent is used that minimizes VOC emissions and is both phosphate free and biodegradable. Thus, the instant invention has achieved the heretofore unattainable result of providing a field deployable, optical connector cleaning process that can reduce reflectance in optical connectors to −60 dB and below without the use of environmentally harmful chemicals and compounds.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

I claim:

1. A process for cleaning a hard surface, comprising the following steps:

preparing a cleaning solution;

providing a first electrostatic dissipative (ESD) wipe;

applying said cleaning solution to said hard surface with said first ESD wipe;

rinsing said hard surface in deionized water; and drying said hard surface.

2. The process of claim 1, further comprising the steps of:

providing a second ESD wipe; and applying deionized water to said hard surface with said second ESD wipe prior to said drying step.

3. The process of claim 1, wherein said cleaning solution preparation step comprises the step of:

diluting acidic detergent with deionized water.

4. The process of claim 1, wherein said cleaning solution comprises 1% to 10% acidic detergent by volume.

5. The process of claim 4, wherein said acidic detergent is biodegradable and contains no phosphates.

6. The process of claim 1, wherein said hard surface comprises a ferrule having a shaft and a face region, and wherein said cleaning solution application step comprises the step of:

applying said cleaning solution to said face region of said ferrule with said first ESD wipe.

7. The process of claim 1, wherein said drying step comprises the steps of:

providing a second ESD wipe;

drying said hard surface with said second ESD wipe; and blow drying said hard surface with a drying agent.

8. The process of claim 7, wherein said drying agent is compressed air.

9. The process of claim 7, wherein said drying agent is dry nitrogen.

10. A process for cleaning an optical connector, comprising the following steps:

providing an ultrasonic bath, said bath having a heating element;

preparing a cleaning solution;

placing a container holding said cleaning solution in said bath;

placing a container holding deionized water in said bath;

heating said bath;

activating the ultrasound;

immersing the connector in said container holding said cleaning solution;

drying the connector with an electrostatic dissipative (ESD) wipe;

immersing the connector in said container holding said deionized water; and drying the connector with a drying agent.

11. The process of claim 10, further comprising the steps of:

immersing the connector in said container holding said cleaning solution; and shaking off excess cleaning solution from the connector prior to said immersion in deionized water step.

12. The process of claim 10, wherein said cleaning solution preparation step comprises the step of:

diluting acidic detergent with deionized water.

13. The process of claim 12, wherein said cleaning solution comprises 1% to 10% acidic detergent by volume.

14. The process of claim 12, wherein said acidic detergent is biodegradable and contains no phosphates.

15. The process of claim 10, wherein said connector is immersed in said cleaning solution for a time period ranging from 15 seconds to 2 minutes.

16. The process of claim 10, wherein said drying agent is compressed air.

17. The process of claim 10, wherein said drying agent is dry nitrogen.

* * * * *